Sept. 7, 1965  H. SCHMIDT, JR  3,204,766
FILTER CAKE THICKNESS DETECTOR
Filed July 17, 1961  2 Sheets-Sheet 1
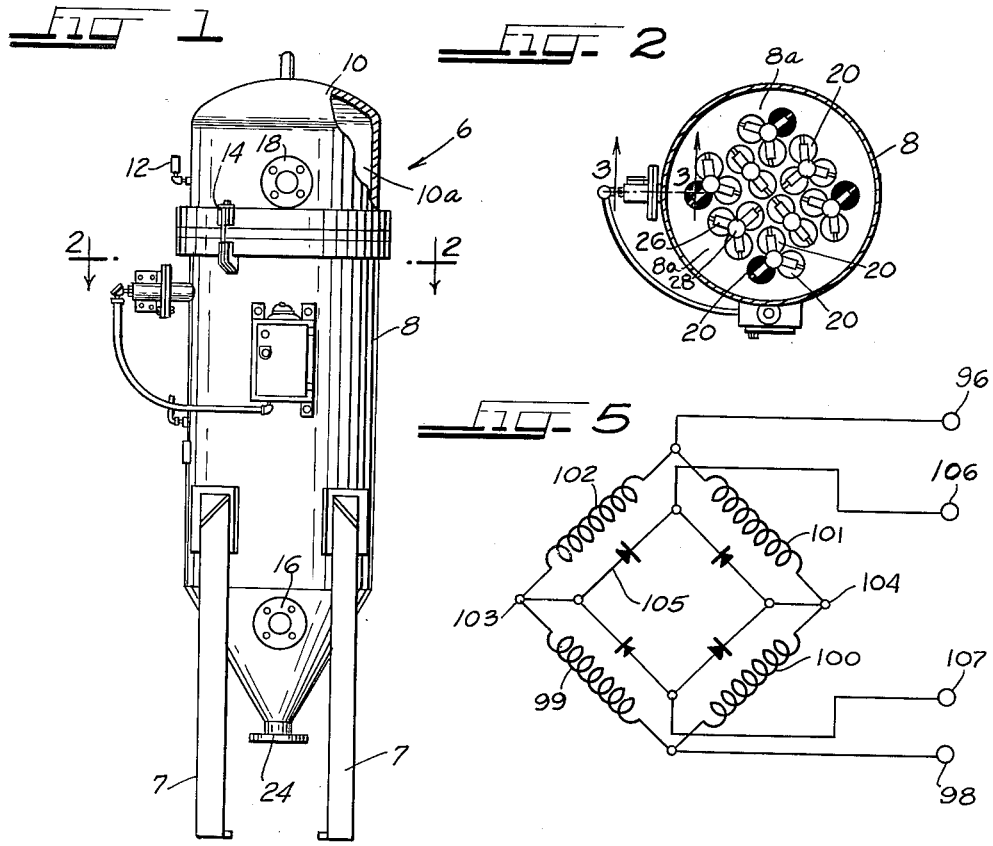
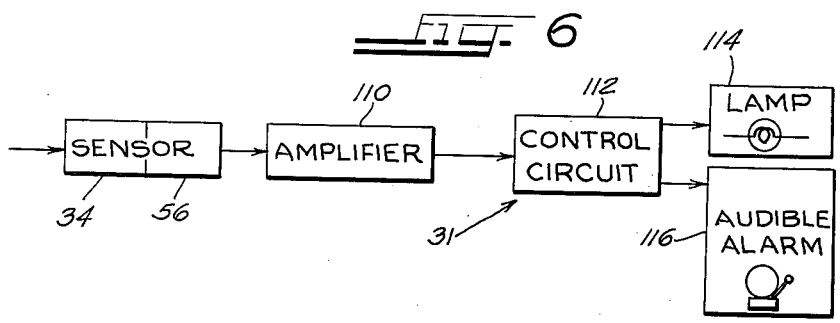
INVENTOR.
HENRY SCHMIDT, JR.
BY
Fidler, Beardsley & Bradley
ATTYS.

Sept. 7, 1965  H. SCHMIDT, JR  3,204,766
FILTER CAKE THICKNESS DETECTOR
Filed July 17, 1961  2 Sheets-Sheet 2
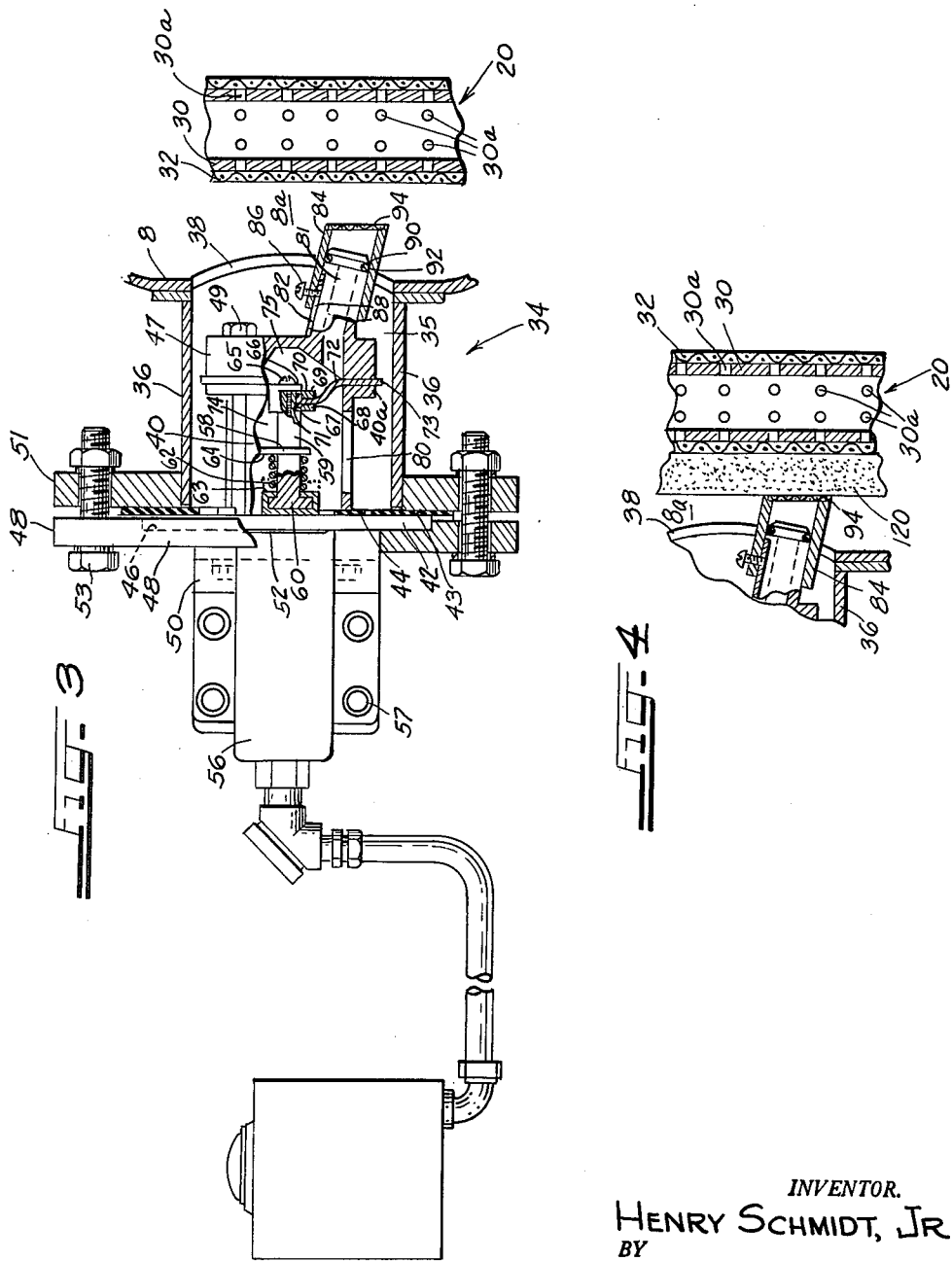
INVENTOR.
HENRY SCHMIDT, JR
BY
Fidler, Beardsley & Bradley
ATTYS.

3,204,766
FILTER CAKE THICKNESS DETECTOR
Henry Schmidt, Jr., Hinsdale, Ill., assignor to Industrial Filter & Pump Mfg. Co., Cicero, Ill., a corporation of Illinois
Filed July 17, 1961, Ser. No. 124,673
6 Claims. (Cl. 210—86)

This invention relates to filters, and it more particularly relates to new and improved methods and means for determining when solid particles deposited in the form of a filter cake on a perforated filter element of a filtration assembly reach a predetermined thickness.

Filters of the type with which the present invention is adapted to be used, employ one or more perforated filtering elements, such, for example, as hollow filter leaves or tubes, through which is passed a liquid to be clarified. The solid matter or particles entrained in the liquid are larger than the interstices of the filtering elements and thus being unable to pass therethrough build up on the respective filter elements in the form of cakes. As the thicknesses of the cakes increase, the cakes offer an ever-increasing resistance to the flow of liquid through the filter.

In order to remove the filter cakes, it is necessary to temporarily discontinue operation of the filter. It is, of course, desirable to minimize the time during which the filter is not in use for filtering purposes, but it is undesirable to permit the cake to build up to such a great thickness that efficiency of the system is greatly impaired, i. e., the filter leaves may become damaged, plugging may occur, and the problems of cleaning the leaves increased thereby. Thus, these two factors are in mutual opposition and a compromise must be reached. For any given installation and process, it can be determined at what cake thickness the filter should be shut down, and the cake removed in order most efficiently to operate the system. Having determined what this cake thickness should be, it becomes necessary during a filter cycle to determine just when the cake has built up to the predetermined thickness at which the cleaning operation should be initiated. The measurement of the cake thickness in order to determine this predetermined point has been a problem long plaguing the filtration industry. The problem is accentuated because of the fact that the characteristics of the filter cakes are markedly different from one process to another, and a cake thickness detector which operates satisfactorily for one type of cake is frequently entirely unsatisfactory for a different type of cake. Nevertheless, some systems have been devised for detecting cake thickness in various ways. Many of these measure the pressure drop across the filtering elements since the pressure differential across the filter elements is dependent upon the thickness of the cake on each element. However, these systems are dependent upon the absolute pressure and flow rate of the system, which factors may vary from time to time, thus increasing the inaccuracy of the detector.

Patent 2,912,110 to Stoltenberg discloses a cake thickness detector system which measures a pressure differential within the system in order to provide an indication of when the cake thickness reaches a predetermined value. One of a pair of pressure sensing probes in the Stoltenberg device is positioned at a location remote from the filtering elements and the other is located in proximity to a filter element so as to be covered by the filter cake on the adjacent element when the cake thickness reaches its desired predetermined value. Although the Stoltenberg system operates satisfactorily for many types of filter cake, it has the disadvantage that for certain materials the cake does not actually build up over and cover the end of the adjacent probe. Therefore, the pressure within both probes remains equal. Moreover, the Stoltenberg device is not easily incorporated in a filtering system, because it employs a number of separate parts which must be independently attached to the filter. Similarly, the Stoltenberg device is relatively expensive to manufacture and sealing of the various parts is difficult. Nevertheless, the principle of detecting the pressure differential on the upstream side of the filtering elements is desirable, since many of the factors heretofore difficult to control in prior art cake thickness detectors, have been eliminated from the cake thickness detecting system.

Therefore, it is an object of the present invention to provide a new and improved system for detecting the thickness of filter cake accumulation.

Another object of the present invention is to provide an improved device for detecting the thickness of a filter cake in a filter assembly.

Still another object of the present invention is to provide an improved pressure-sensitive device for indicating the presence of a filter cake of predetermined thickness on a filter element.

A further object of the present invention is to provide an improved pressure-sensitive device responsive to the existence of a differential pressure caused by filter cake accumulation in a filter assembly for automatically actuating visual or audible signals, alternatively or simultaneously, to indicate the accumulation of the filter cake on a filter element in the assembly beyond a predetermined thickness.

Briefly, the above and further objects are realized in accordance with the present invention by means of a pressure-responsive cake thickness detector which is completely mounted in a single compact unit and which is attachable to a filter as a single unit. The detector is separated into a first pressure sensing portion located within the filter chamber and a second signal producing portion completely sealed from the first part and mounted outside of the filter chamber. The pressure sensing portion within the filter chamber comprises two compartments separated by a movable diaphragm having one side open to the chamber at a location remote from the filtering elements and having the other side connected by means of an adjustable probe to a point in proximity to a filter element. The probe is tubular and has the open end portion covered by a grid against which the filter cake builds up when the cake reaches a predetermined thickness. The presence of the grid insures that the cake will actually cover the probe and separate the passageway through the probe from the liquid on the upstream side of the filter elements.

Yet another object of the present invention is to provide a new and improved method for sensing, and visually or audibly indicating, the existence of a filter cake of a predetermined thickness on filter elements in a filter assembly.

These and other objects, features and advantages of the present invention will become readily apparent from a careful consideration of the following detailed description, when considered in conjunction with the accompanying drawing illustrating one embodiment of a pressure-sensitive filter cake indicating system constructed in accordance with the principles of the present invention and wherein like reference numerals and characters refer to like and corresponding parts throughout the several views, and wherein:

FIG. 1 is an elevational view of a filter assembly incorporating the details of a filter cake thickness indicating system constructed in accordance with the principles of the present invention;

FIG. 2 is a cross-sectional view taken along line 2—2 of FIG. 1;

FIG. 3 is an enlarged fragmentary view in partial section illustrating the details of a pressure-responsive filter cake thickness detection device found useful in the system of FIG. 1;

FIG. 4 is an enlarged fragmentary view in partial section illustrating the effects of filter cake accumulation on the pressure-responsive detection device of FIG. 3;

FIG. 5 is a circuit diagram of an electromagnetic sensor device employed in the indicating system of FIG. 1; and FIG. 6 is a schematic view in block diagram form of the filter cake thickness indicating system of FIG. 1.

Referring now to the drawings and particularly to FIG. 1 thereof, there is shown a filter assembly, generally designated by the numeral 6, which is vertically mounted on frame stanchions or support legs 7 and which comprises a tank 8 having a dome top closure 10 removably secured to the tank 8 by a plurality of clamps 14.

The tank 8 defines a pressurizable filter chamber 8a and is provided with an inlet 16 for introduction under pressure of the liquid from which entrained solid particles are to be removed.

The inlet 16 is disposed near the bottom of the chamber 8a so that the inlet liquid flows upwardly into the tank filter chamber 8a wherein are mounted a plurality of hollow, perforated, tubular filter elements 20 which may, if desired, be clustered in groups of two or three, as clearly appears in FIG. 2 to provide an arrangement presenting a maximum filtering area.

The cavities in the elements 20 are connected to a dome chamber 10 and the liquid is filtered as it passes through the filter elements 20 in passing through the filter 6. In passing through the elements 20, the entrained solids collect thereon and accumulate in a layer or cake. Consequently, as the filter continues to operate, the cake continues to increase in thickness. Meanwhile, the clarified liquid passes into each of the filter tubes 20, into the dome chamber 10a and out of the filter through a suitable outlet 18. It will be appreciated that the chamber 8a is separated from the dome chamber 10a by a plate (not shown) which is perforated to receive the upper end of each of the filter elements 20.

The flow conditions through the filter assembly 6 may be controlled by suitable valve means (not shown) of conventional construction and, for cleaning and maintenance purposes, a drain outlet 24 is formed in the tapered bottom of the tank 8.

Although any conventional filter element may be employed in the practice of the present invention, such, for example, as planar filter leaves, for purposes of illustration the filter tubes 20 are shown in the drawings with the filter elements 20 arranged in groups of two and three, each group being supported on a radial arm 26 carried by a vertical rod 28 which extends axially of the tank 8 and which is fixedly supported therein by means not shown.

Each filter element 20, as appears in FIG. 3, comprises an inner filter tube 30 and a concentric outer covering 32 of fine mesh screen material conforming to the shape of the inner tube 30. Each tube 30 is provided throughout with apertures 30a to permit the liquid to flow therethrough.

Referring to FIG. 6, in order to prevent the filter cake from exceeding a predetermined thickness and to thereby minimize both reduction in efficiency of the filter assembly 6 and the possibility of damage to the filter elements 20, there is provided a filter cake thickness indicating system 31 constructed in accordance with the present invention. The system 31 includes a cake thickness detection device 34 which may be attached as a unit to the tank 8 and which is responsive to a pressure differential in the chamber 8a to produce an electric signal. The electric signal may be used to actuate a suitable device for producing a visual and/or audible signal. Also, the electric signal may be used to operate automatic cycle control apparatus for terminating flow of the filter medium into the filter 6 when the filter cake reaches a predetermined thickness.

For the purpose of mounting the detector 34 in the system, the tank 8 is provided with a sleeve 36 welded to the tank 8 in registry with an aperture 38 opening into the filter chamber 8a adjacent a filter element 20. The sleeve 36 thus defines a chamber 35 in which a diaphragm housing 40 of the pressure-responsive filter cake thickness detection device 34 is mounted.

In general, the detector 34 includes the generally cylindrical diaphragm housing 40 removably supported in the chamber 35. At its end remote from the tank 8, the housing 40 is supported in a central location in the chamber 35 on a nonmagnetic mounting plate 42. The mounting plate 42 seats in a central recess 46 formed in an annular end flange 48 of a bracket 50 which is bored, as indicated at 52, to partially receive an electromagnetic sensing device 56 secured thereto as by bolts 57. As more fully described hereinafter, the electromagnetic sensing device 56 is operatively responsive to the detection device 34 for producing an electric signal when the cake reaches the predetermined thickness.

Adjacent the tank aperture 38, the diaphragm housing 40 is closed by a centrally recessed end cap or plate 47 removably secured thereto as by bolts 49 which also secures the entire diaphragm housing assembly to the plate 42.

With the housing 40 secured to the plate 42 and the plate 42 seated in the recess 46, the housing 40 may be assembled to the sleeve 36 by bolts 53 securing the end flange 48 to a complementary end flange 51 of the sleeve 36. A gasket 43 separates the end flanges 48 and 51 to assure a leakproof connection therebetween.

In the diaphragm housing 40, a guide 58 secured by means (not shown) supports a reciprocal diaphragm stem 59 which carries at one end, adjacent the mounting plate 42, an encapsulated cylindrical magnetic steel disc 60 which is normally urged to a first position in engagement with the mounting plate 42 of the diaphragm housing 40 by resilient means, such as a spring 62, which is bottomed at one end against a shoulder 63 provided by the encapsulated disc 60 and at its other end against a shoulder 64 provided by the diaphragm stem guide 58. It will be observed that the mounting plate 42 physically separates the disc 60 from the electromagnetic sensing device 56.

Adjacent the end cap 47, the diaphragm stem 59 is axially bored to receive in threaded engagement therewith a retaining screw 65 which cooperates with a washer 66 and a shoulder 67 provided by a reduced portion 68 of the stem 59 to securely maintain a two-piece and centrally apertured coupling 69 which is annularly grooved, as indicated at 70, to receive a raised and annular aperture-defining portion 71 of a diaphragm 72 through which extends the stem 59 to thereby maintain the diaphragm 72 secured to the stem 59 and to maintain a diaphragm flange 73 between an out-turned flange 40a of the housing 40 and the end cap 47. In this manner, the diaphragm 72 separates the housing chamber 40 into a first pressurizable compartment 74 and a second pressurizable compartment 75 defined by the end cap 47.

The sensing device 56 is actuated by the detector 34 when a sufficient pressure differential exists between the opposed diaphragm compartments 74 and 75 to overcome the force of the diaphragm return spring 62 and to cause movement of the diaphragm 72, diaphragm stem 59, and steel disc 60 from contact with the mounting plate 42, to the position shown by the dotted lines in FIG. 3.

The diaphragm compartment 74 is in fluid communication with the tank filter chamber 8a by means of the aperture 38, the sleeve chamber 35, and a diaphragm housing formed aperture 80, whereas the compartment 75 is in fluid communication with the tank filter chamber 8a adjacent a filter element 20 by means of a passage 81 formed in an external nipple 82 extending from the end pipe 47.

Slidably disposed over the nipple 82 is a generally cylindrical sleeve 84 which is adjustably secured thereto by a set screw 86 seated in a groove 88 formed in the nipple 82. Seal means, such as an O-ring 90, seated in an annular external groove 92 formed in the nipple 82, prevents fluid leakage between the sleeve 84 and the nipple 82. A mesh screen 94 is carried on the end of the sleeve 84 adjacent a filter element 20. It will be observed that the end of the sleeve 84 is angled relative to the housing 40 so as to permit drainage from compartment 75. The adjustability feature of the sleeve 84 provides means whereby the pressure response of the detecting device 34 may be adjusted to permit detection of any desired thickness of filter cake.

The electromagnetic sensing device 56, which is actuated when the filter cake accumulation exceeds a predetermined thickness, as appears in FIG. 4, comprises an inductance bridge arrangement which is energizable from an A.C. voltage source (not shown) connected to a pair of power terminals 96 and 98. A plurality of inductance coils 99, 100, 101, and 102 provide the four arms of the bridge and are preferably wound contiguously about a one-half inch square silicon iron core with the coils 101 and 102 located adjacent the mounting plate 42. The values of the coils 99–102 are selected so that the bridge is normally unbalanced when the magnetic disc 60 lies against the nonmagnetic plate 42 and, therefore, a potential difference of predetermined value exists between the points 103 and 104. Accordingly, movement of the disc 60 away from the mounting plate 42 decreases the current through the coils 101 and 102 to increase the reactance thereof and thereby to balance the bridge to reduce the output voltage appearing between the terminals 103 and 104 to zero. Preferably, a full wave rectifier 105 is employed to eliminate the necessity of shielding of the output leads connected to the terminals 106 and 107.

When the inductance bridge is balanced by movement of the disc 60 to the position shown by the dotted lines in FIG. 3, the output voltage produced across the terminals 106 and 107 is reduced to zero. The output signal derived from the sensing device 56 and fed to the amplifier 110 is an inverse square function of the distance between the magnetic disc 60 and the adjacent end of the sensing device 56.

As shown in the block diagram of FIG. 6, the output of the amplifier 110 is fed to a conventional control circuit means 112 which may actuate alternately, or simultaneously, visual signal means, such as a lamp 114 or audible signals means, such as a bell alarm 116. It will be appreciated that the control circuit 112 may also be employed to actuate means (not shown) for interrupting the flow of the fluid filter medium into the tank 8 through the inlet 16 and for otherwise initiating a filter cleaning cycle.

In operation, liquid initially flows into the tank chamber 8a under pressure and flows through the screen 94 to fill the compartment 75. Similarly, the liquid flows through aperture 38 into sleeve chamber 35 and through the diaphragm housing aperture 80 into the compartment 74 and the diaphragm hermetically separates the two compartments, 74 and 75.

Before a filter cake covers over the sleeve 84 the hydraulic pressures in the compartments 74 and 75 are equal and, therefore, the disc 60 is maintained by the spring 62 in the position shown by the solid lines in FIG. 3 in contact with the mounting plate 42. The reluctance in the magnetic circuit is at a minimum and the inductance bridge circuit of the sensing device 56 is out of balance with an output being derived therefrom.

As the entrained solids are deposited on the filter element 20 they accumulate to form a cake 120 which builds up toward the screen 94. When the thickness of the cake reaches a predetermined maximum value as established by the spacing between the screen 94 and the filter element 20, as appears in FIG. 4, when the cake 120 builds up against the screen 94, the pressure in compartment 75 decreases since the compartment 75 is now separated from the liquid in the chamber 8a by the cake 120 and in communication through the filter cake 120 with the interior of the filter element 20 which is at a lower pressure than the filter chamber 8a. The filter cake, in building up to this predetermined cross-sectional thickness, contacts the screen 94 thereby blocking the passage 81, so that the pressure in compartment 75 is reduced and becomes less than the pressure in compartment 74. It will be appreciated, therefore, that this reduced pressure in compartment 75 is a function of the pressure drop through a specific thickness of the filter cake accumulated on the filter element. The differential pressure existing between compartments 74 and 75 causes the diaphragm to be forced to the right, to the position shown by the dotted lines in FIG. 3, against the tension of the diaphragm return spring 62. The steel disc 60 is thus carried to the right by movement of the stem 59 and, in so moving, the steel disc 60 decreases the reluctance of the magnetic circuit of the inductance bridge. The bridge is thereby balanced to produce an output signal which is fed to the amplifier 110. The derived output from the amplifier 110 actuates the control circuit 112 to energize the lamp 114 or audible alarm 116, as appears in the block diagram of FIG. 6. The operator of the filter assembly is thereby overtly alerted to the fact that the thickness of the filter cake has reached or exceeded a predetermined value and that the filter element requires cleaning. In place of the lamp 114 and alarm 116, the output signal from the amplifier 110 may be used to operate a suitable cycle controller for automatically initiating a filter cleaning operation.

Among the features of the present invention are those of extreme accuracy and the absence of a requirement for tubing and the like to the outside of the filter assembly. Accuracy of the detection system of the present invention is a function of the relation of the diaphragm return spring 62 and the size of the diaphragm 72. For example, the larger the diaphragm 72, the more accurate the system, and system accuracy is controllable to a point where only inches of water pressure need be required to cause the diaphragm to move to actuate the sensing device 56. Such accuracy is, of course, quite important in that some filter cakes, because of inherent characteristics, have extremely low pressure drops thereacross, and it will be appreciated that these low pressure drop cakes are of the type requiring an extremely accurate detection system to protect the filter elements from damage.

Since the present indicating system is substantially structurally independent of and outside of the filter assembly, the problems of maintenance, repair, and cleaning of the detection system are minimized. Another important feature of the present invention resides in employment of the screen 94 mounted on the end of the sleeve 84. It will be appreciated that when considered microscopically, the outer surface of the filter cake is not uniform and, without the screen 94, the cake tends to build up in the passage 81 only on one side thereof without building up uniformly across the passage. Under such circumstances, the filter cake builds up partially in the passage 81 without completely covering the tube passage and the filter cake therefore can reach a cross-sectional thickness greater than the desired predetermined thickness without actuating the sensing device 56. By employing the screen 94, the filter cake builds up uniformly against the screen 94 and, thus, the indicating system of the present invention operates accurately to actuate the sensing device 56 under all flow conditions generally encountered.

Although various minor modifications of the present invention will become readily apparent to those versed in the art, it should be understood that it is desired to embody within the scope of the patent warranted hereon all such embodiments as reasonably and properly come within the scope of the contribution to the art hereby made.

I claim:

1. A filter cake thickness detection system comprising, an outer housing in fluid communication with the upstream side of the filter chamber of a filter assembly through an aperture formed in the wall of the filter assembly, a diaphragm housing centrally supported in the outer housing and in spaced relation to the wall of the filter assembly, a diaphragm fixedly supported in the diaphragm housing on a stem and separating the housing into first and second pressurizable compartments, said diaphragm being movably responsive to a pressure differential thereacross existing between said compartments, guide means slidably supporting the stem in the first compartment, a magnetic disc movably carried in the first compartment by the stem near one end thereof adjacent a nonmagnetic end wall of the diaphragm housing, spring means biasing the magnetic means in contact with said nonmagnetic end wall, an adjustable sleeve communicating the second compartment with the upstream side of the filter chamber in a location adjacent a filter element, an aperture formed in the bottom wall of the diaphragm housing for communicating the first compartment with the upstream side of the filter chamber in a location remote from the filter element, and signal producing means responsive to movement of the disc caused by an increase in the thickness of the filter cake on the filter element to a predetermined value established by the spacing between the sleeve and the filter element.

2. A filter cake thickness detection system comprising an outer housing in fluid communication with the upstream side of the filter chamber of a filter assembly through an aperture formed in the wall of the filter assembly, a fixed nonmagnetic end wall on said housing, a diaphragm housing centrally supported in the outer housing and in spaced, outward relation to the wall of the filter assembly, a diaphragm centrally supported in the diaphragm housing and separating the housing into first and second pressurizable compartments, a portion of said diaphragm being movably responsive to a pressure differential thereacross existing between the compartments, a stem connected to said movable portion of said diaphragm, guide means slidably supporting the stem in the first compartment, first magnetic means carried in the first compartment by the stem near one end thereof adjacent said non-magnetic end wall of the diaphragm housing, a passaged probe communicating the second compartment with the upstream side of the filter chamber adjacent a filter element, the end of said probe being adjustably positioned to provide a predetermined spacing between said end of the probe and said filter element, an open screen extending across said end of the probe adjacent the filter element, an aperture formed in the lower wall of the diaphragm housing for communicating the first compartment with the upstream side of the filter chamber in a location remote from the filter element and second magnetic means mounted externally of said wall of the filter assembly responsive to movement of said first magnetic means for producing an indication of the thickness of the filter cake deposited on said filter element.

3. A filter cake thickness detection system comprising an outer housing in fluid communication with the upstream side of the filter chamber of a filter assembly through an enlarged aperture formed in the wall of the filter assembly, a diaphragm housing centrally supported in the outer housing and in spaced relation to the wall of the filter assembly, a movable diaphragm centrally supported in the diaphragm housing on a movable stem and separating the housing into first and second pressurizable compartments, said diaphragm being movably responsive to a pressure differential thereacross existing between said compartments, guide means slidably supporting the stem in the first compartment, a magnetic disc movably carried in the first compartment by the stem near one end thereof adjacent a non-magnetic end wall of the diaphragm housing, spring means for normally biasing the magnetic means in contact with said non-magnetic end wall, a passaged probe communicating the second compartment with the upstream side of the filter chamber adjacent a filter element, said probe being adjustable to within a predetermined distance from said filter element, an open screen extending across the end of the probe adjacent the filter element, an aperture formed in the wall of the diaphragm housing for communicating the first compartment with the upstream side of the filter chamber in a location remote from the filter element, and magnetic means mounted adjacent said non-magnetic wall of said diaphragm housing, and responsive to movement of said magnetic disc for indicating the position of said diaphragm in said housing.

4. A filter cake thickness detector for providing an indication of when a filter cake has built up to a predetermined thickness on a filter element mounted in a pressurized filter tank, comprising
an outer housing secured to said tank over an aperture in said tank,
said housing comprising a tubular portion sealed at one end to said tank and a nonmagnetic wall portion sealably connected across the other end of said tubular portion thereby to preserve the hermetic condition of said tank,
a diaphragm housing mounted in said outer housing externally of said tank in communication with the filter chamber in said tank,
a flexible diaphragm mounted in said diaphragm housing and separating said diaphragm housing into a first and a second compartment,
said diaphragm housing having an enlarged opening in the bottom thereof communicating said first compartment with said filter chamber through the interior of said tubular portion of said outer housing,
an open ended conduit extending from said second compartment through said aperture into said tank toward said filter element,
means for adjusting the position of the open end of said conduit relative to said filter element,
said conduit providing the only inlet to said second compartment,
a magnetic member formed of magnetic material mounted to a movable portion of said diaphragm for movement with said movable portion,
spring means biasing said magnetic member against said nonmagnetic wall portion,
and magnetic means mounted externally of said outer housing in proximity to said nonmagnetic portion and responsive to movement of said magnetic member away from said nonmagnetic housing portion for indicating when a filter cake builds up over the said end of said conduit.

5. Apparatus for detecting the thickness of a filter cake deposited on a filter element in a filter tank, comprising a tubular member surrounding an opening in the wall of said tank directly opposite said filter element, a housing mounted in said tubular member, said tubular member having an internal size substantially larger than the external size of said housing, said housing being entirely disposed within said tubular member in direct communication with a filter chamber provided in said tank, a flexible diaphragm disposed in said housing, said diaphragm having the periphery thereof fixedly secured and sealed to said housing for separating said housing into first and second pressurizable compartments, an open-ended conduit supported by said housing and extending from said tubular member into said tank, said conduit opening at one end into said second compartment and at the other end into said filter chamber at a location in proximity to a location on said filter element at which said filter cake builds up whereby during operation of said filter said filter cake gradually closes over said other end of said conduit to reduce the pressure in said first compartment, an open mesh screen fastened over said other end of said conduit, said housing having an enlarged opening in the lower wall thereof opening into said second compartment whereby said second compartment is in fluid communication with said filter chamber, said opening being remote from said filter element whereby the fluid connection between said second compartment and said filter chamber is not altered by a build-up of said filter cake on said filter element, and means responsive to predetermined movement of said diaphragm relative to said compartments for producing an indication that said filter cake has a predetermined thickness.

6. A removable unit adapted to detect the thickness of a filter cake in a filter assembly including a filter chamber having at least one filter element therein comprising, an outer housing mounted on the wall of the filter assembly in fluid communication with the upstream side of the filter chamber through an aperture formed in the wall of the filter assembly, a diaphragm housing supported in the outer housing, a diaphragm supported in the diaphragm housing in a first position on a movable stem, means to produce an indication when said diaphragm is in a predetermined position, means carried by said stem and responsive to movement of the diaphragm to a second position for actuating said means to produce an indication, said diaphragm separating said housing into first and second pressurizable compartments, an adjustable sleeve on the diaphragm housing for communicating the second compartment with the upstream side of the filter chamber, said sleeve being adapted to extend into the interior of the filter chamber and be maintained in predetermined spaced relation with the filter element, an open screen extending across the end of the sleeve adjacent the filter element, an aperture formed in the diaphragm housing communicating the first compartment with the upstream side of the filter chamber through an aperture formed in the wall of the filter assembly and means normally biasing the diaphragm to said first position.

References Cited by the Examiner

UNITED STATES PATENTS

| 2,376,912 | 5/45 | Green | 210—86 X |
| 2,669,707 | 2/54 | Ehrman | 210—130 X |
| 2,912,110 | 11/59 | Stoltenberg | 210—90 |
| 3,050,858 | 8/62 | Giesse | 210—86 X |
| 3,056,281 | 10/62 | Smyth | 73—38 |
| 3,068,694 | 12/62 | Worswick | 340—239 |

FOREIGN PATENTS 558,859   6/58   Canada.

REUBEN FRIEDMAN, *Primary Examiner.*

HERBERT L. MARTIN, *Examiner.*